G. O. DUIGAN.
MIRROR ADJUSTMENT.
APPLICATION FILED MAR. 20, 1911.
1,009,727.
Patented Nov. 28, 1911.
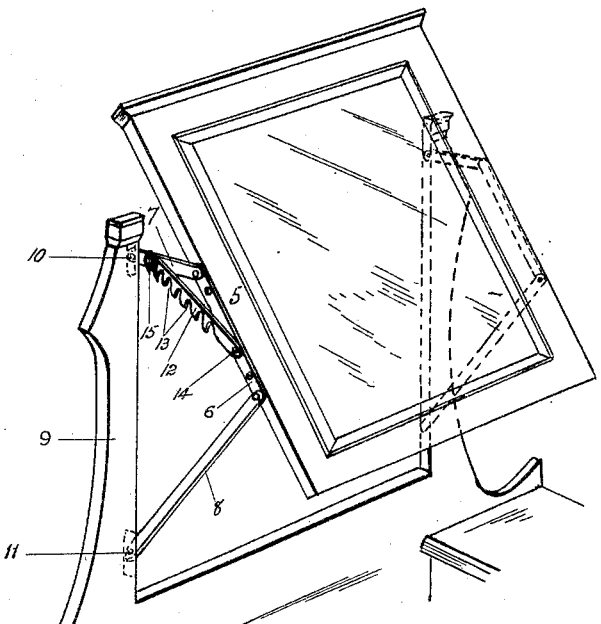
Fig. I.
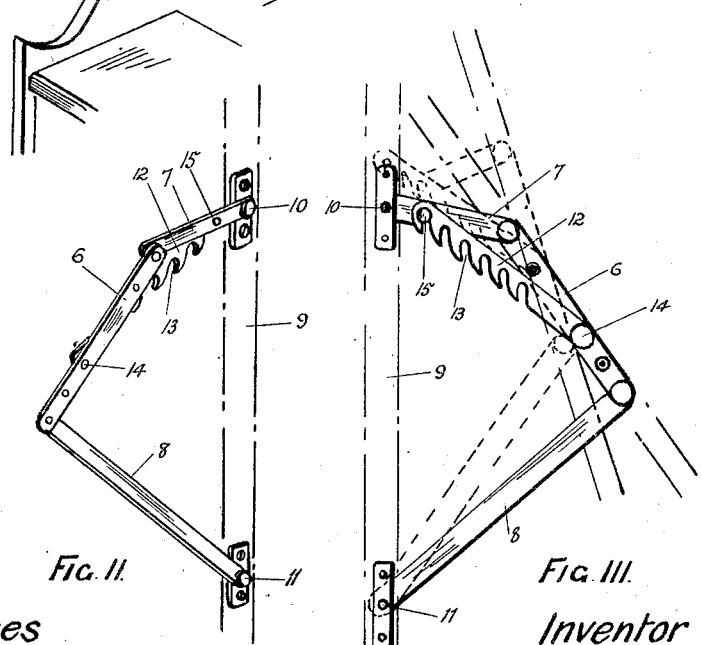
Fig. II.　　　Fig. III.
Witnesses　　　Inventor
　　　　　　　George O. Duigan.

UNITED STATES PATENT OFFICE.

GEORGE OSWALD DUIGAN, OF MARRICKVILLE, NEW SOUTH WALES, AUSTRALIA.

MIRROR ADJUSTMENT.

1,009,727.   Specification of Letters Patent.   Patented Nov. 28, 1911.

Application filed March 20, 1911. Serial No. 615,556.

*To all whom it may concern:*

Be it known that I, GEORGE OSWALD DUIGAN, a subject of the King of Great Britain and Ireland, residing at Averley, Meeks Road, Marrickville, in the State of New South Wales, Commonwealth of Australia, have invented certain new and useful Improvements in Mirror Adjustments, of which the following is a specification.

This invention is devised with the object of providing a means for supporting an adjustable mirror which will securely maintain the latter at any desired angle and be capable of easy manipulation.

Various devices have been invented for carrying swinging mirrors, but most of these depend for their efficiency upon frictional contact which under the stress of wear and tear is apt to become loose and consequently useless for the purpose of retaining the mirror at the desired angle.

My invention consists of two sets of levers, one on each side of the mirror, each set consisting of an upper and lower lever, the latter being the longer, each pivoted at one end to the mirror-frame and at the other to the stanchions or uprights which support the mirror. On one of the sets of levers a rack-bar pivoted at one end to the mirror-frame, engages with a pin upon the upper lever in such a manner as to retain the mirror at any desired angle within certain limits.

A practical illustration of my invention is shown in the accompanying drawings forming part of this specification and in which:—

Figure 1 is a perspective view of a portion of a dressing-table showing my invention applied thereto for the purpose of supporting the adjustable mirror. Fig. 2 is a perspective view of one set of levers in the extreme position. Fig. 3 is a side elevation of the same also showing in dotted lines another position of the levers, rack-bar and mirror.

As before stated and as will be seen by reference to the drawings, the rack-bar is necessary upon one side only, which may be called the regulating side, and I will confine myself to a description of that side only, the other side being identical (with the exception of the said rack-bar and engagement-pin therefor).

To the side of the mirror frame 5 is affixed the plate 6 having pivoted to its upper and lower extremities one end of the upper and lower levers 7 and 8 respectively, the other ends of which are pivoted to the stanchion 9 at points 10 and 11 respectively. A rack-bar 12 having on its underside a series of notches 13 is also pivoted to the plate 6 at 14, the said notches being designed and adapted to engage as required with a steady pin 15 for the purpose of retaining the system at any desired angle.

I have found by experiment that the lengths between the pivotal points of the upper lever, the plate 6, the lower lever and the stanchion should be proportionate and that taking the upper lever as the unit these proportions should be approximately as follows:—

Upper lever _____ 1
Plate 6 _____ 1.6
Lower lever _____ 2.6
Stanchion _____ 3.2

Assuming the mirror to be set as shown in Fig. 1 and it being desired to place it in a more vertical position, the lower portion is pushed backward and upward;—the rack-bar by the peculiar formation of the notches releases itself from the pin 15 and the notches slide over the pin until the movement ceases when the rack-bar automatically reëngages therewith. To restore the mirror to the first position the rack-bar is disengaged and the parts moved until the desired position is attained when the rack-bar is again permitted to engage with the pin and to retain the parts in the new position.

What I claim and desire to secure by Letters Patent is:—

1. An improved mirror adjustment consisting of a pair of relatively proportionate levers each pivotally attached at one end to a stanchion and at the other end to a mirror frame, and a rack-bar pivoted between the pivotal attachments of the said levers to the mirror frame and engaging with a pin projecting from the upper lever; all substantially as herein set forth and substantially as described and illustrated.

2. The combination of an upper and lower lever of relative proportionate lengths each pivotally attached at one end to a stanchion and at the other end to a mirror, with a rack-bar pivotally attached to the said mirror and engaging a pin upon the upper lever for the purpose of supporting and providing means for adjustment of the said mirror.

3. In devices of the kind set forth, a pair of relatively proportioned levers each pivotally attached at one end to a stanchion and at the other end to a mirror frame, and a rack-bar pivoted between the pivotal attachments of the said levers to the mirror-frame and engaging with a pin projecting from the upper lever; all in combination with an adjustable mirror of ordinary construction.

Signed at Sydney, New South Wales, this 20th day of January, 1911.

GEORGE OSWALD DUIGAN.

Witnesses:
CHAS. HATTON,
WM. NEWTON.

---

Copies of this patent may be obtained for five cents each, by addressing the "Commissioner of Patents, Washington, D. C."